United States Patent [19]
Hoffer

[11] Patent Number: 6,040,977
[45] Date of Patent: Mar. 21, 2000

[54] PALM REST FOR A KEYBOARD OR A PORTABLE COMPUTER HAVING A NUMERIC KEYPAD

[75] Inventor: Cary J. Hoffer, Albany, Oreg.

[73] Assignee: Hewlett-Packard Company, Palo Alto, Calif.

[21] Appl. No.: 09/183,067

[22] Filed: Oct. 30, 1998

[51] Int. Cl.[7] .................................................. G06F 1/16
[52] U.S. Cl. .......................... 361/680; 341/22; 345/168; 235/145 R
[58] Field of Search ............................... 361/680; 341/22; 345/168; 248/918; 364/708.1; 235/145 R

[56] References Cited

U.S. PATENT DOCUMENTS

| | | | |
|---|---|---|---|
| 4,689,761 | 8/1987 | Yurchenco | 364/708 |
| 5,063,376 | 11/1991 | Chang | 340/706 |
| 5,341,154 | 8/1994 | Bird | 364/708.1 |
| 5,402,121 | 3/1995 | Noorbehesht | 341/26 |
| 5,583,497 | 12/1996 | Hankes | 341/22 |
| 5,689,253 | 11/1997 | Hargreaves et al. | 341/22 |
| 5,764,474 | 6/1998 | Youens | 361/680 |

*Primary Examiner*—Leo P. Picard
*Assistant Examiner*—John D. Reed
*Attorney, Agent, or Firm*—Teri G. Andrews; Curtis G. Rose

[57] ABSTRACT

A portable computer includes a base with a keyboard on an upper surface and having a front portion and a rear portion. A display housing is connected to the base. There is a palm rest disposed and extending across the front portion of the base. The palm rest includes a numeric keypad. The numeric keypad can be enabled by depressing a function key located on the keyboard, such as the Num Lock key, or optionally by a switch associated with a cover. This cover can also be used without an associated switch to prevent accidental activation of a key on the numeric keypad.

23 Claims, 7 Drawing Sheets

PALM REST FOR A KEYBOARD OR A PORTABLE COMPUTER HAVING A NUMERIC KEYPAD

FIELD OF THE INVENTION

The present invention concerns a numeric keypad and more specifically to a palm rest for a keyboard or portable computer that includes a numeric keypad.

BACKGROUND OF THE INVENTION

Computers have evolved from room-sized apparatus to desktop personal computers and then to devices which have a size similar to or smaller than a three-ringed notebook, often referred to as portable computers. Although the smaller computers work great as portable devices while away from the office, the reduced size of the computer often produced discomfort for the user's hands and wrists while using the keyboard. This led to a need to provide a wrist or palm rest for the user at the same level as the top of the keyboard. Placing a separate palm rest in front of the keyboard has addressed this need.

In reducing the computer to a portable size, certain input devices commonly associated with larger computer systems were combined in order to provide a more compact device. For example, the numeric keypad usually found on full size desktop keyboards was eliminated from portable computer keyboards to save space. In order to input numbers from portable computers, the numbers across the top of the alphanumeric keyboard were used. However, unless the user is familiar with the layout of the alphanumeric keyboard and is a reasonably good typist, data entry can be inconvenient and time consuming. As a result, stand-alone numeric keypads became available as after market input peripheral devices. Unfortunately, the need to carry an additional device along with the portable computer while away from the office has detracted from the portability of the portable computer.

Another solution to the elimination of the separate numeric keypad on the portable computer keyboards was to place "embedded" keys in the configuration of a typical numeric keypad within the alpha keys of the keyboard. The embedded keys are available only after a "Num Lock" key on the keyboard is activated. After the Num Lock key has been activated, the embedded keys on the keyboard respond as numeric, rather than alpha, keys. Unfortunately, this typically means that at least eight letters of the alphabet, including up to three vowels, are not available for use when the Num Lock key is activated. As a practical matter, this turns the whole keyboard into a numeric keypad and renders it useless for other purposes. This is undesirable since users often switch back and forth between tasks and need to retain the complete functionality of the alpha keys on the keyboard at all times.

While these types of embedded numeric keypads do provide access to numeric keys in a numeric keypad configuration, many users of portable computers would prefer the use of a separate numeric keypad which can be used simultaneously with the other alphanumeric and function keys on the keyboard. A separate non-embedded numeric keypad is particularly desirable for use with accounting and spreadsheet software programs.

SUMMARY OF THE INVENTION

A portable computer includes a base with a keyboard on an upper surface and having a front portion and a rear portion. A display housing is connected to the base. There is a palm rest disposed and extending across the front portion of the base. The palm rest includes a numeric keypad.

The numeric keypad can be enabled by depressing a function key located on the keyboard, such as the Num Lock key, or optionally by a switch associated with a cover. This cover can also be used without an associated switch to prevent accidental activation of a key on the numeric keypad.

DETAILED DESCRIPTION OF A PREFERRED EMBODIMENT

Figure 1:
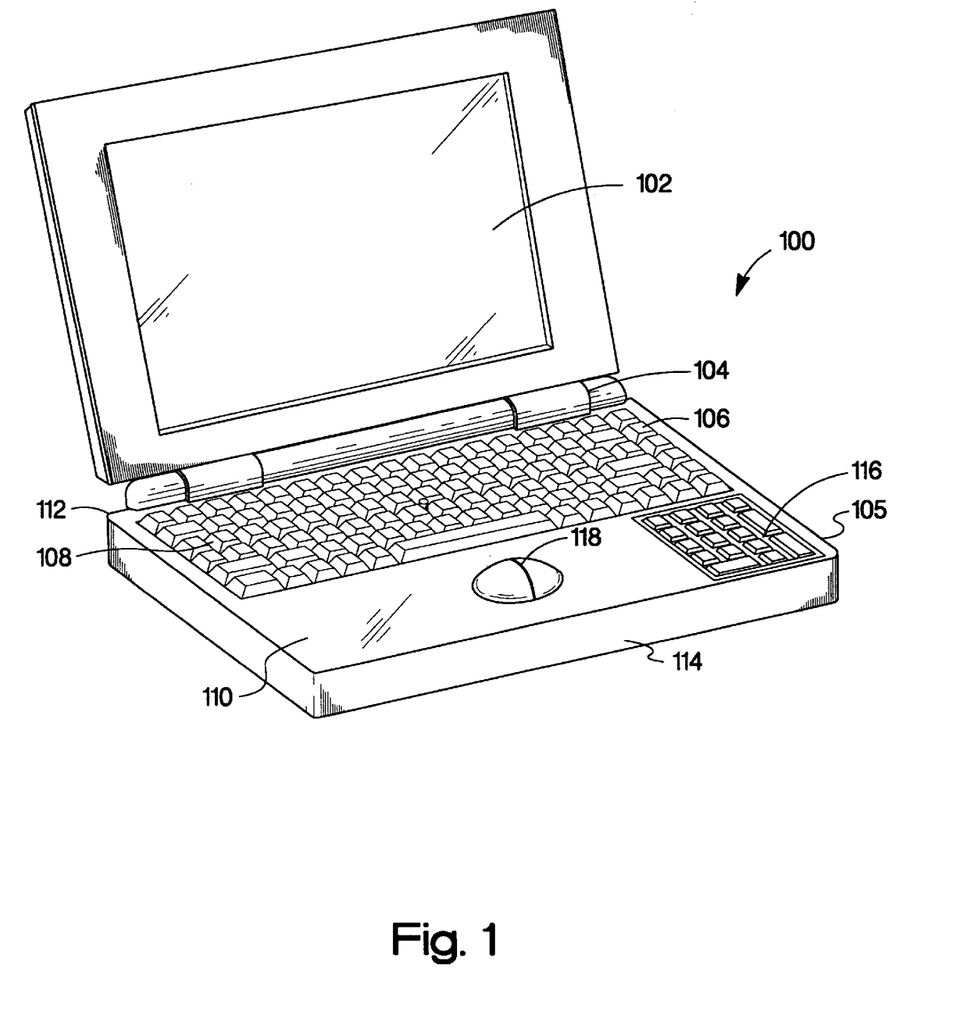
FIG. 1 illustrates a portable computer in the preferred embodiment of the present invention.

FIG. 1 illustrates a portable computer 100 in the preferred embodiment of the present invention. Portable computer 100 includes a display 102 which is connected to base 105 by a hinge 104. On the top surface of base 105 there is a keyboard 108 positioned along a rear portion 112 of base 105 and a palm rest 110 positioned along a front portion 114 of base 105 adjacent to keyboard 108. Palm rest 110 includes numeric keypad 116. In the preferred embodiment, numeric keypad 116 is built into palm rest 110. Although numeric keypad 116 is preferably in the right half of palm rest 110, it has been contemplated that numeric keypad 116 could be at any position built into or on the top surface of palm rest 110. Num Lock key 106 preferably enables numeric keypad 116. Although a Num Lock key 106 can be located anywhere on keyboard 108, Num Lock key 106 is typically in the upper right quadrant of keyboard 108. Input device control buttons 118 are preferably located in the center of palm rest 110, but could be located elsewhere on palm rest 110 or elsewhere on or associated with keyboard 108.

An alternate embodiment has been contemplated where display 102 is not connected to base 105 by hinge 104, but instead is connected to base 105 by a cable or through wireless transmissions between base 105 and display 102.

Figure 2:
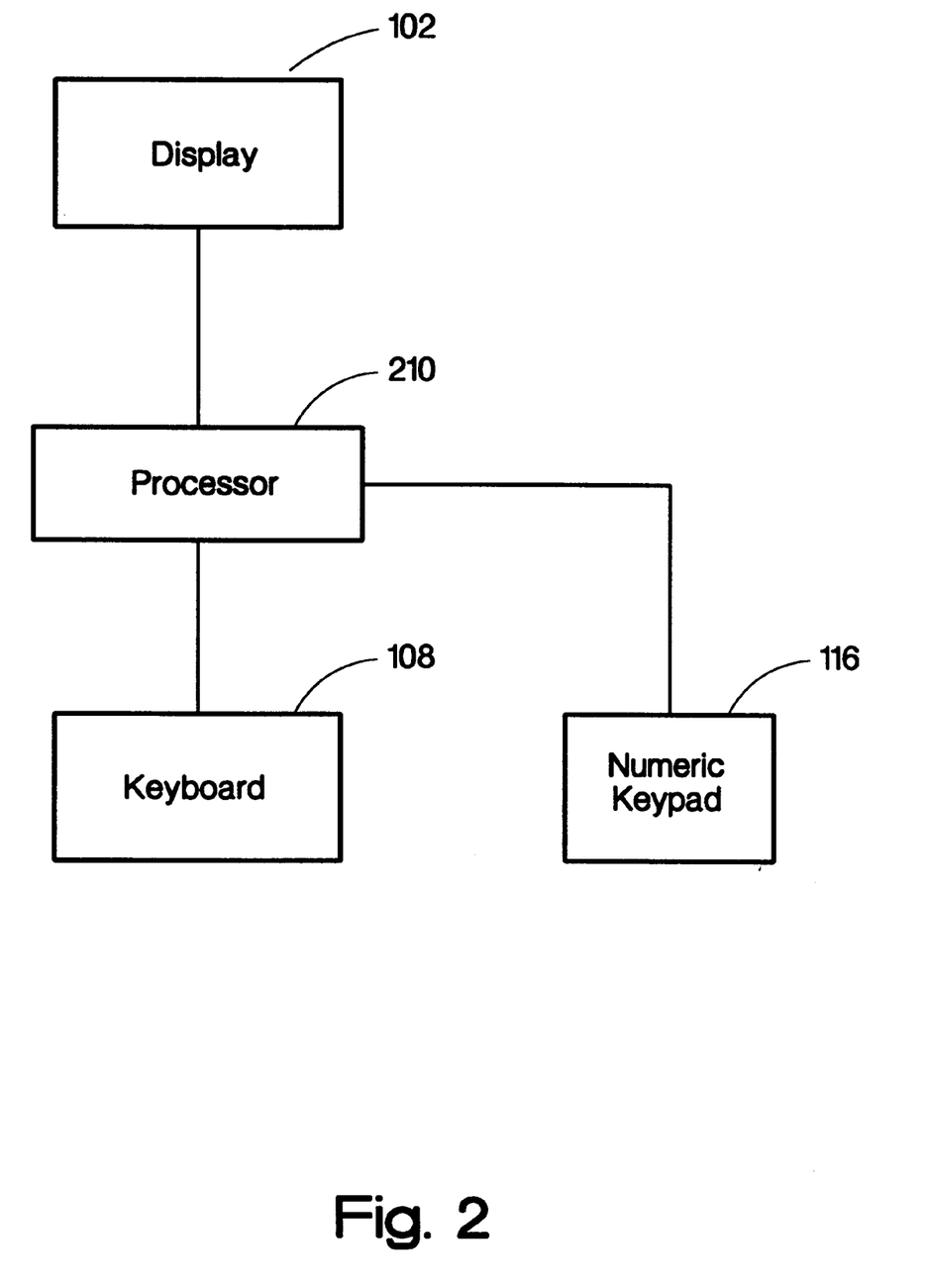
FIG. 2 is a representation of a block diagram of the portable computer in the preferred embodiment.

FIG. 2 is a representation of a block diagram of the portable computer in the preferred embodiment. Computer 100 (FIG. 1) has a processor 210 which displays graphics and text on display 102 as a result of instructions from keyboard 108 and numeric keypad 116. Numeric instructions can be sent to processor 210 by either numeric keypad 116, when enabled in the manner discussed in more detail later, or by the conventional numeric keys on keyboard 108.

Figure 3:
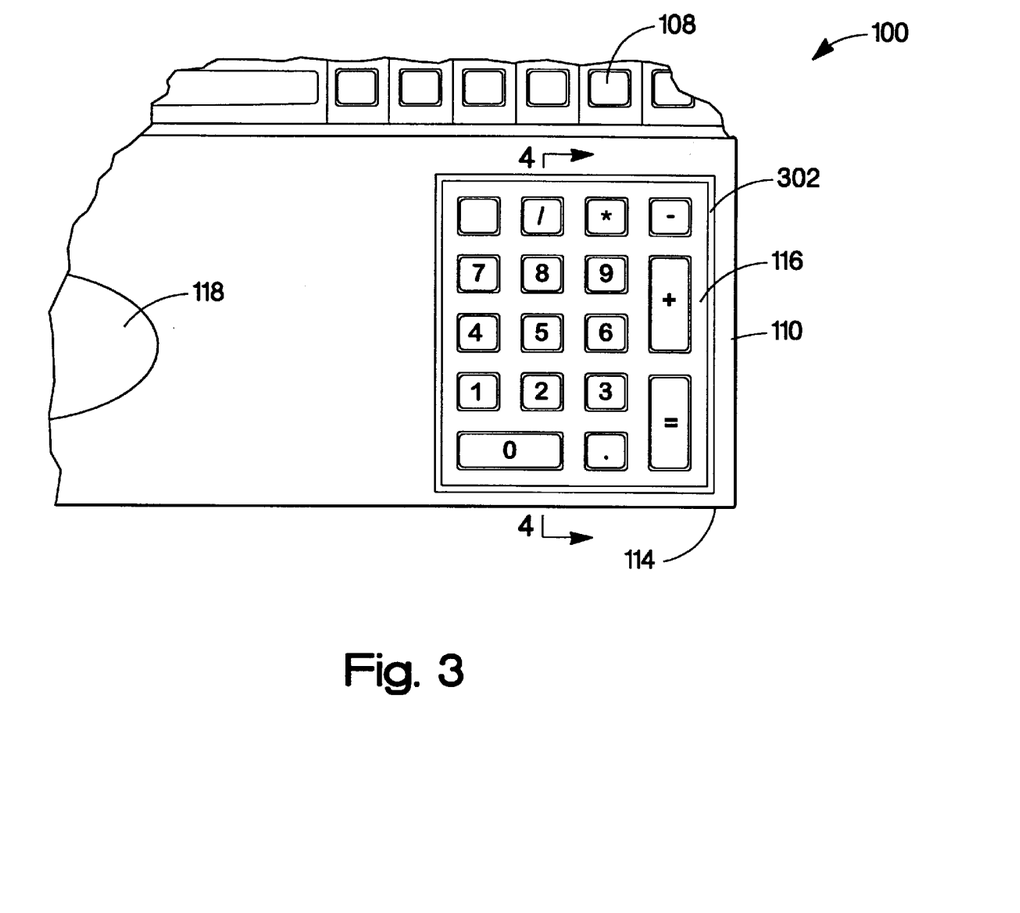
FIG. 3 is a top view of the numeric keypad located on the palm rest of a portable computer in the preferred embodiment.

FIG. 3 is a top view of the numeric keypad 116 located on palm rest 110 of portable computer 100 in the preferred embodiment. Preferably, numeric keypad 116 is attached from an interior surface of palm rest 110 and visible through an aperture 302 in palm rest 110. In the preferred embodiment, numeric keypad 116 is shown having seventeen keys. However, the number and functions of the keys could vary with different applications.

Figure 4:
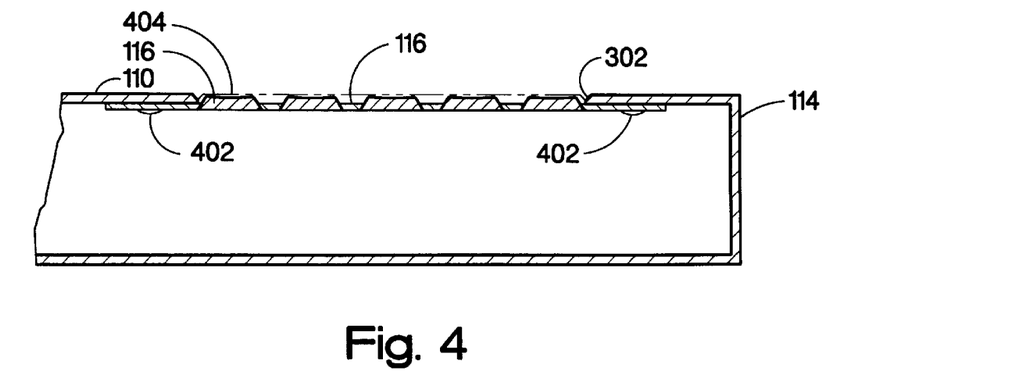
FIG. 4 depicts a cross section of the numeric keypad of the preferred embodiment of FIG. 3 taken through line 4—4.

FIG. 4 depicts a cross section of the numeric keypad 116 of the preferred embodiment of FIG. 3 taken through line 4—4. Preferably, numeric keypad 116 has very thin keys which slightly protrude through aperture 302 when numeric keypad 116 is attached to the interior surface of palm rest 110. The tops of the keys on numeric keypad 116 are approximately the same elevation as the top surface of palm rest 110 as illustrated in FIG. 4. This preferred configuration with flat, thin keys will create minimal surface roughness to the user's wrists when using the alphanumeric keyboard. In the preferred embodiment, numeric keypad 116 is attached to the interior surface of palm rest 110 by fasteners 402. However, it has been contemplated to attach numeric keypad 116 with other fastening means such as glue, heat staking, or brackets.

An alternate embodiment has been contemplated where numeric keypad 116 is a touch screen display or a membrane keypad. In this embodiment, keypad 116 has relatively uniform thickness so as to minimize any sensation of roughness as the user's wrists rest on top of keypad 116 when the user is typing on the alphanumeric keys of keyboard 108. In this embodiment, numeric keypad 116 could be built into palm rest 110 in the manner shown in FIG. 4, where the top surface of numeric keypad 116 is relatively flush with the top surface of palm rest 110. Alternatively, in this embodiment, numeric keypad 116 could be placed on the top surface of palm rest 110, and would therefore protrude slightly from the top surface of palm rest 110.

In another alternate embodiment, numeric keypad 116 includes a removable cover 404 as shown in phantom in FIG. 4. Removable cover 404 functions as a safeguard against the user's wrists or hands activating keys on numeric keypad 116 when not in use, and also serves to minimize any sensation of roughness from numeric keypad 116. In this embodiment, numeric keypad 116 is enabled, and the cover is used to prevent accidental activation of a key on numeric keypad 116.

To activate numeric keypad 116, in the preferred embodiment, a function key, such as the Num Lock key, works as a toggle to enable and disable numeric keypad 116. This feature of the invention avoids inadvertent input from wrists of users on numeric keypad 116 during use of keyboard 108.

Figure 5:
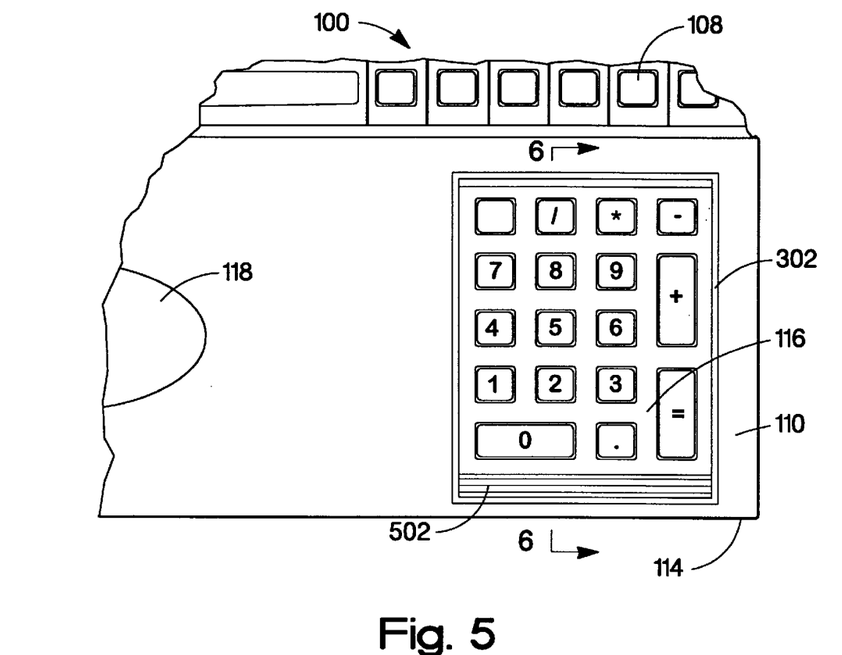
FIG. 5 is a top view of an alternate embodiment of a numeric keypad located on the palm rest of a portable computer having a slideably attached cover in the open position.

FIG. 5 is a top view of an alternate embodiment of numeric keypad 116 located on palm rest 110 of portable computer 100 having a slideably attached cover 606 in the open position. With slideably attached cover 606 in the open position, the only portion of slideably attached cover 606 visible is cover grasp portion 502. Cover grasp portion 502 is located along one edge and slightly raised above the surface of slideably attached cover 606 so a user can easily grasp the edge of slideably attached cover 606 to slide between the open and closed position. Preferably slideably attached cover 606 slides between an open position (as shown) with cover grasp portion 502 toward base front 114 to a closed position with cover grasp portion 502 toward keyboard 108. However, it has been contemplated to have the movement of slideably attached cover 606 in an opposite direction as well as in a side to side direction.

Figure 6A:
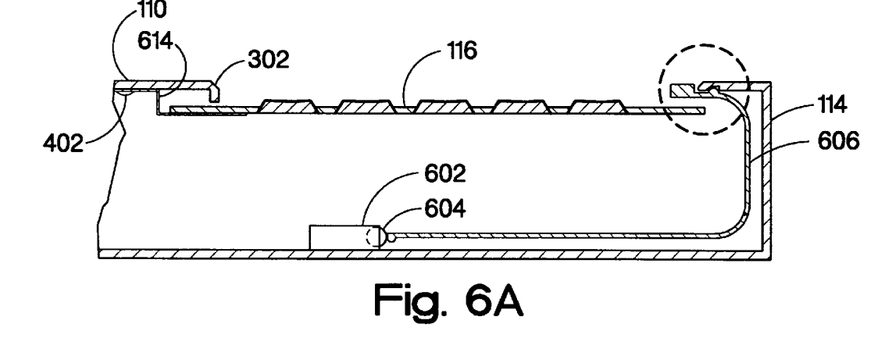
FIG. 6 depicts a cross section of the numeric keypad of the alternate embodiment of FIG. 5 taken through line 6—6.
Figure 6B:
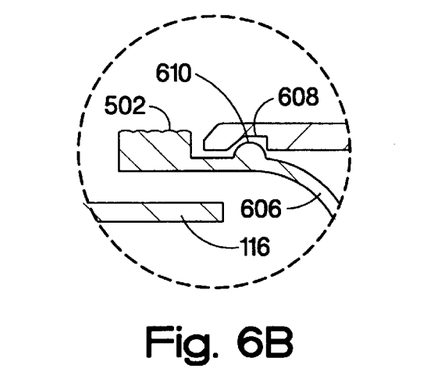

FIG. 6A depicts a cross section of numeric keypad 116 of the alternate embodiment of FIG. 5 taken through line 6—6. Slideably attached cover 606 is shown in an open position. There is a first raised portion 608 near cover grasp portion 502 that engages with complementary recessed portion 612 when slideably attached cover 606 is in the open position as shown (FIG. 6B). This embodiment includes a numeric keypad enable switch 602 with a switch actuator 604. When slideably attached cover is in the open position, as shown, the edge opposite cover grasp portion 502 depresses switch actuator 604 of numeric keypad enable switch 602 activating numeric keypad 116.

Figure 7:
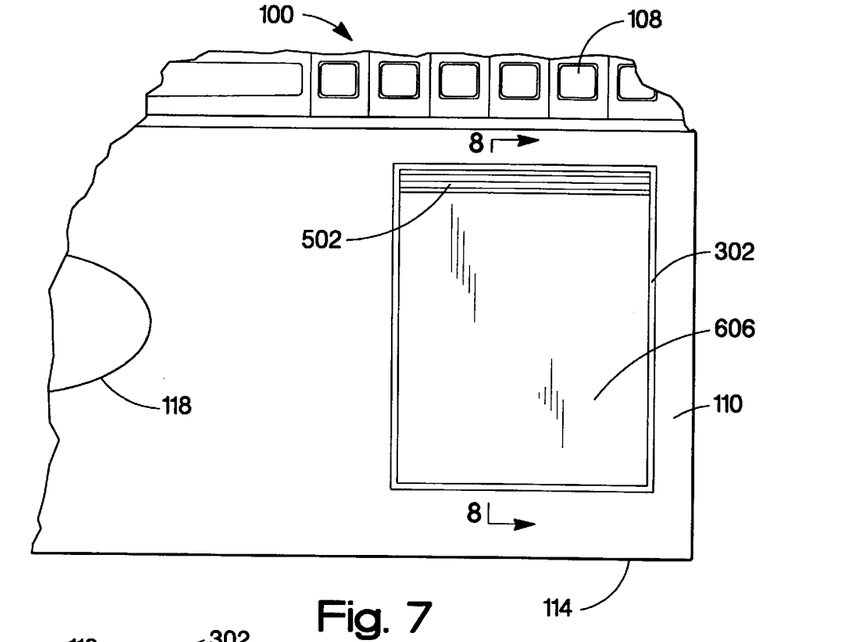
FIG. 7 is a top view of an alternate embodiment of a numeric keypad located on the palm rest of a portable computer having a slideably attached cover in the closed position.

FIG. 7 is a top view of an alternate embodiment of numeric keypad 116 located on palm rest 110 of portable computer 100 with slideably attached cover 606 in the closed position.

Figure 8A:
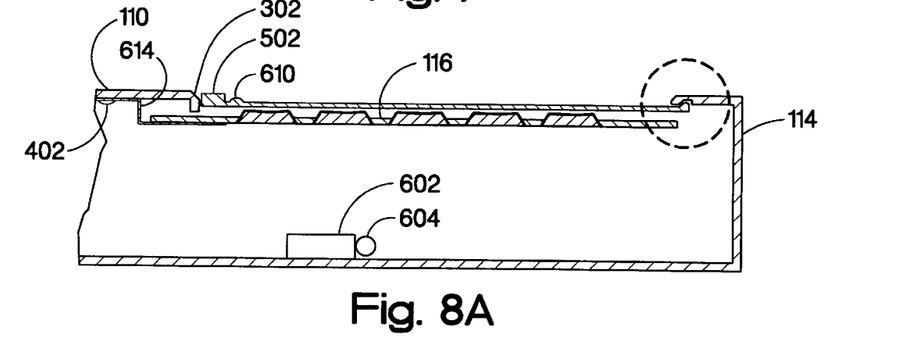
FIG. 8 depicts a cross section of the numeric keypad of the alternate embodiment of FIG. 7 taken through line 8—8.
Figure 8B:
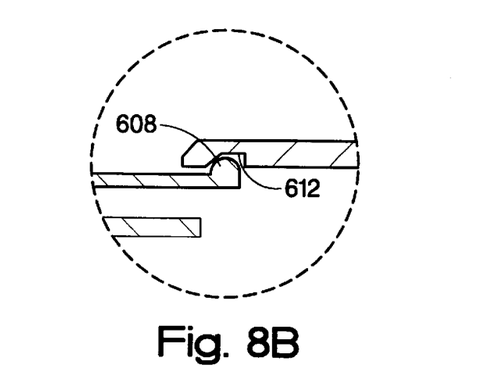

FIG. 8A depicts a cross section of numeric keypad 116 of the alternate embodiment of FIG. 7 taken through line 8 - 8. With slideably attached cover 606 in the closed position, as shown, switch actuator 604 of numeric keypad enable switch 602 is in the unactuated position, thereby disabling numeric keypad 116. and a second raised portion 610 is engaged in complementary recessed portion 612 (FIG. 8B). This engagement assists in maintaining slideably attached cover 606 in the closed position while numeric keypad 116 is not in use.

Figure 9:
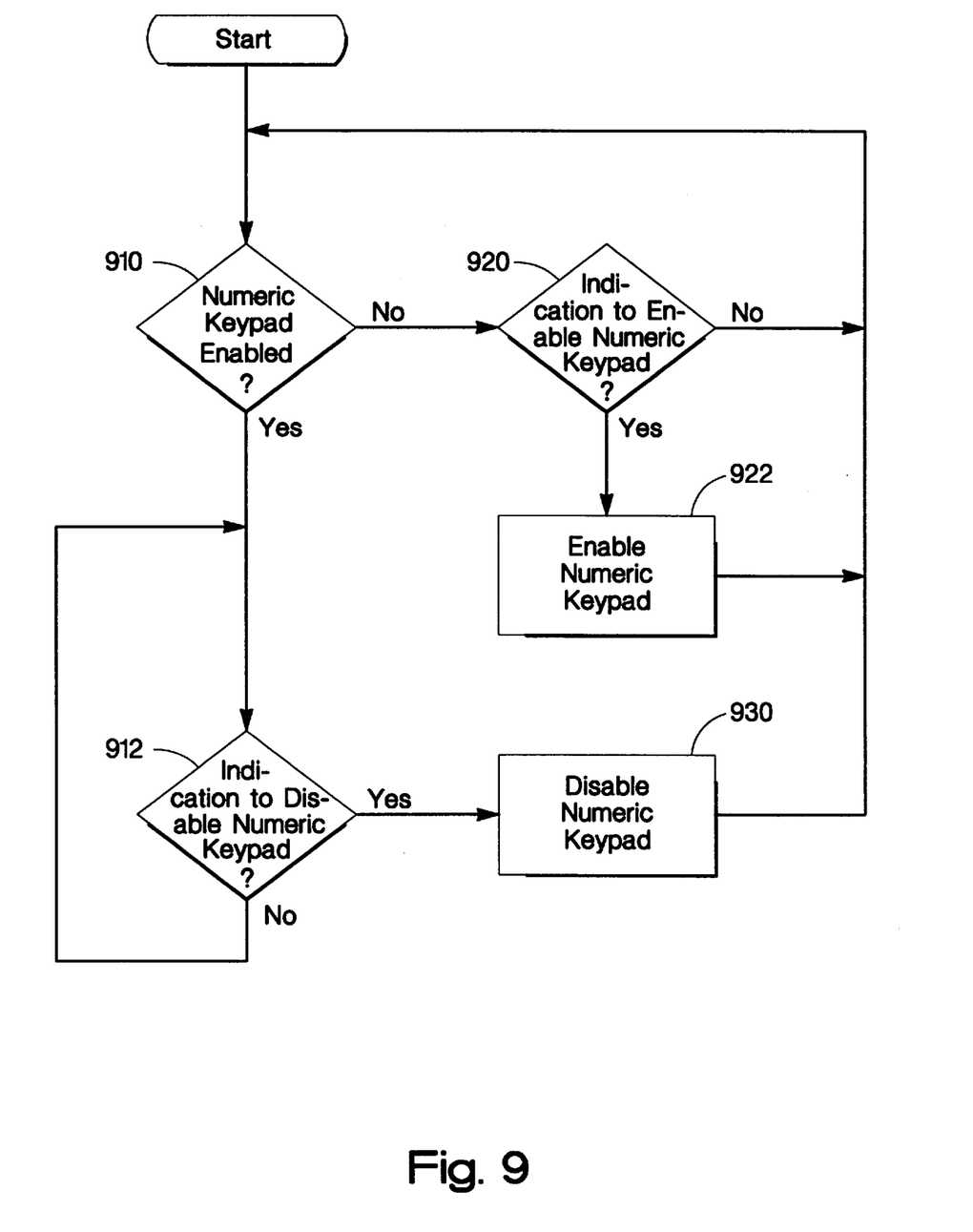
FIG. 9 is a representation of the flowchart of the preferred embodiment of the present invention for determining when numeric keypad is enabled within the portable computer system.

FIG. 9 is a representation of the flowchart of the preferred embodiment of the present invention for determining when to enable numeric keypad 116. In block 910, processor 210 (FIG. 2) is querying the status of numeric keypad 116. If numeric keypad 116 is enabled, control moves to block 912 where processor 210 allows input from numeric keypad 116 until a signal to disable numeric keypad 116 is received and control moves to block 930 where the functions of numeric keypad 116 are disabled. If in block 910 numeric keypad 116 is not enabled, control moves to block 920 where processor 210 checks for an input signal to enable numeric keypad 116. When a signal to enable numeric keypad 116 is received by processor 210 control moves to block 922 and numeric keypad 116 is enabled allowing input from numeric keypad 116.

In the preferred embodiment and alternate embodiments already discussed, numeric keypad 116 is activated by depressing the Num Lock key 106 or by switch 602 associated with cover 606. However, additional alternate embodiments have been contemplated. For example, numeric keypad 116 can be enabled all the time, especially if it is located in an area of palm rest 110 that receives minimal contact from the user's wrists or hands during normal operation of the keyboard 108, such as the center section of the palm rest. Another alternate embodiment has the Num Lock key 106 as one of the keys of numeric keypad 116 rather than keyboard 108.

Figure 10:
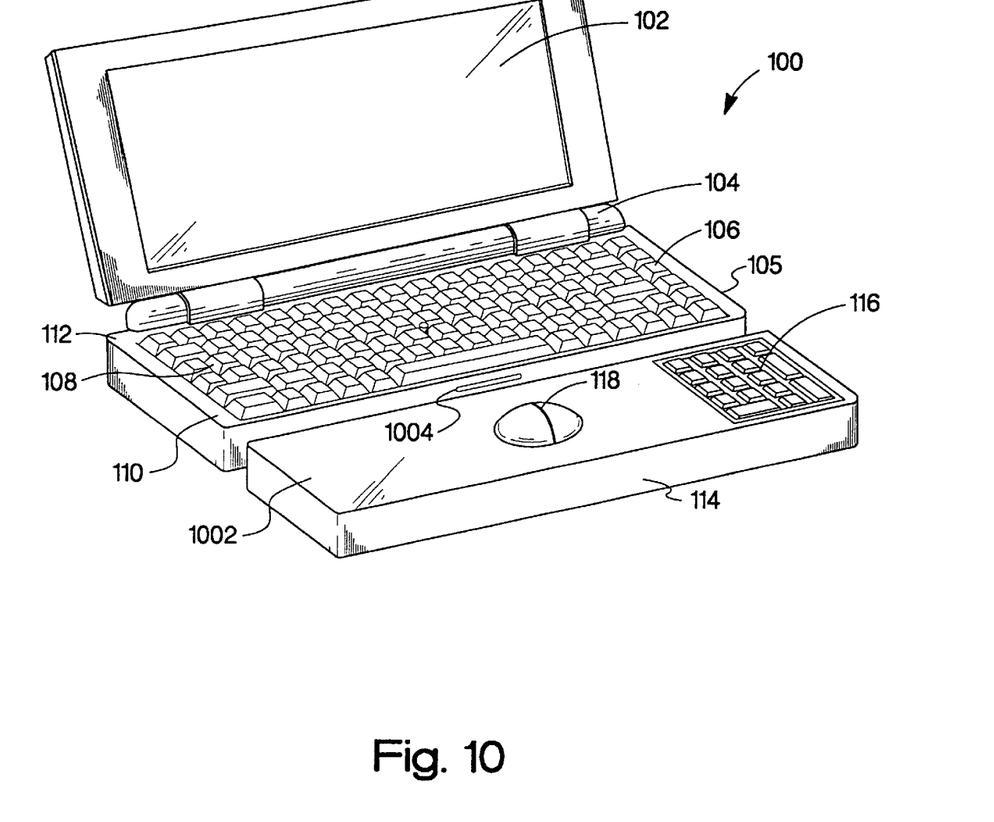
FIG. 10 illustrates an alternate embodiment of a portable computer with a numeric keypad in a detachable palm rest.

FIG. 10 illustrates an alternate embodiment of portable computer 100 with numeric keypad 116 located on a detachable palm rest 1002. This configuration would be useful for the smaller portable computers that desire to maintain the smaller size. Detachable palm rest 1002 is shown in a detached state to illustrate connection device 1004. Through connection device 1004, numeric keypad 116 communicates with processor 210 as previously described in FIG. 2. The functionality of numeric keypad 116 in this alternate embodiment could be any of the configurations shown and described in FIG. 3 through FIG. 8.

What is claimed is:

1. A portable computer, comprising:

a base having a keyboard on an upper surface and having a front portion and a rear portion;

a display connected to said base;

a palm rest disposed across said front portion of said base, said palm rest having a top surface and an inner surface, wherein said palmrest is detachably connected to said base through a connection device; and said palm rest further comprising a numeric keypad in communication with the computer through said connection device.

2. The portable computer of claim 1, wherein said numeric keypad is built into said palm rest.

3. The portable computer of claim 1, wherein said numeric keypad is on said top surface of said palm rest.

4. The portable computer of claim 1, wherein said numeric keypad is enabled by depressing a function key located on said keyboard and said numeric keypad is disabled by depressing said function key a second time.

5. The portable computer of claim 4, wherein said function key is a Num Lock key.

6. The portable computer of claim 1, wherein said numeric keypad further comprises a removable cover, wherein said removable cover prevents activation of said numeric keypad while covering said numeric keypad.

7. A portable computer, comprising:

a base having a keyboard on an upper surface and having a front portion and a rear portion:

a display connected to said base:

a palm rest disposed across said front portion of said base, said palm rest having a top surface and an inner surface; and said palm rest further comprising a numeric keypad having a slideably attached cover, said cover having a closed position wherein said numeric keypad is not visible and an open position exposing said numeric keypad.

8. The portable computer of claim 7, wherein said cover has a cover grasp portion for grasping said cover thereby sliding said cover between said closed position and said open position.

9. The portable computer of claim 7, further comprising a numeric keypad enable switch wherein said slideably attached cover activates said numeric keypad enable switch when said slideably attached cover is in said open position and said numeric keypad enable switch is not activated when said slideably attached cover is in said closed position.

10. The portable computer of claim 7, wherein said slideably attached cover slides along said inner surface of said palm rest of said base.

11. The portable computer of claim 10, wherein said slideably attached cover has a first raised portion and a second raised portion, and said palm rest having a complementary recessed portion disposed on said inner surface of said palm rest, wherein said first raised portion engages with said complementary recessed portion when said slideably attached cover is in said closed position, and wherein said second raised portion engages with said complementary recessed portion when said slideably attached cover is in said open position.

12. The portable computer of claim 10, further comprising a numeric keypad enable switch, wherein said slideably attached cover actuates said numeric keypad enable switch when said slideably attached cover is in said open position thereby enabling said numeric keypad.

13. A palm rest, comprising:

a top surface and an inner surface; and a numeric keypad, wherein said palm rest is attachable and detachable to a keyboard.

14. The palm rest of claim 13, wherein said numeric keypad is enabled by depressing a function key located on said keyboard, and said numeric keypad is disabled by depressing said function key a second time.

15. The palm rest of claim 14, wherein said function key is a Num Lock key.

16. The palm rest of claim 13, wherein said numeric keypad further comprises a removable cover, wherein said removable cover prevents activation of said numeric keypad while covering said numeric keypad.

17. A palm reset, comprising:

a top surface and an inner surface; and a numeric keypad having a slideably attached cover, said slideably attached cover having a closed position wherein said numeric keypad is not visible and an open position exposing said numeric keypad, and wherein said palm rest is attachable to a keyboard.

18. The palm rest of claim 17, wherein said cover has a cover grasp portion for grasping said cover thereby sliding said cover between said closed position and said open position.

19. The palm rest of claim 17, further comprising a numeric keypad enable switch wherein said slideably attached cover activates said numeric keypad enable switch when said slideably attached cover is in said open position and said numeric keypad enable switch is not activated when said slideably attached cover is in said closed position.

20. The palm rest of claim 17, wherein said slideably attached cover slides along said inner surface of said palm rest.

21. The palm rest of claim 20, wherein said slideably attached cover having a first raised portion and a second raised portion, and said palm rest having a complementary recessed portion disposed on said inner surface of said palm rest, wherein said first raised portion engages with said complementary recessed portion when said slideably attached cover is in said closed position, and wherein said second raised portion engages with said complementary recessed portion when said slideably attached cover is in said open position.

22. The palm rest of claim 20, further comprising a numeric keypad enable switch, wherein said slideably attached cover actuates said numeric keypad enable switch when said slideably attached cover is in said open position thereby enabling said numeric keypad.

23. A method for using a numeric keypad disposed on a palm rest of a portable computer, said numeric keypad having a slideably attached cover, said slideably attached cover having an open position, a closed position, and a proximate numeric keypad enable switch, comprising the steps of:

powering said portable computer by toggling a power switch disposed on said portable computer; and sliding said slideably attached cover to said open position, thereby exposing said numeric keypad and actuating said numeric keypad enable switch thereby enabling said numeric keypad.

* * * * *